(12) United States Patent
Li et al.

(10) Patent No.: US 12,022,202 B2
(45) Date of Patent: Jun. 25, 2024

(54) IMAGE SENSOR, GLOBAL SHUTTER CONTROL METHOD AND COMPUTER STORAGE MEDIUM

(71) Applicant: SHANGHAI JUYOU SMART INTELLIGENCE TECHNOLOGY CO., LTD, Shanghai (CN)

(72) Inventors: Dan Li, Shanghai (CN); Yang Pan, Shanghai (CN)

(73) Assignee: SHANGHAI JUYOU SMART INTELLIGENCE TECHNOLOGY CO., LTD, Shanghai (CN)

(*) Notice: Subject to any disclaimer, the term of this patent is extended or adjusted under 35 U.S.C. 154(b) by 211 days.

(21) Appl. No.: 17/632,586

(22) PCT Filed: Nov. 9, 2020

(86) PCT No.: PCT/CN2020/127577
§ 371 (c)(1),
(2) Date: Feb. 3, 2022

(87) PCT Pub. No.: WO2021/232700
PCT Pub. Date: Nov. 25, 2021

(65) Prior Publication Data
US 2022/0294963 A1 Sep. 15, 2022

(30) Foreign Application Priority Data
May 20, 2020 (CN) .......................... 202010428267.6

(51) Int. Cl.
*H04N 23/73* (2023.01)
*H04N 23/60* (2023.01)

(52) U.S. Cl.
CPC ............. *H04N 23/73* (2023.01); *H04N 23/60* (2023.01)

(58) Field of Classification Search
CPC ........ H04N 23/60; H04N 23/73; H04N 23/75; H04N 25/745; H04N 25/772;
(Continued)

(56) References Cited

U.S. PATENT DOCUMENTS 9,769,398 B2 * 9/2017 Nalla ..................... H04N 25/53
11,475,101 B2 * 10/2022 Catthoor ............... G06F 15/825
(Continued)

FOREIGN PATENT DOCUMENTS

CN 1691110 A 11/2005
CN 104683710 A 6/2015
(Continued)

*Primary Examiner* — Pritham D Prabhakher
(74) *Attorney, Agent, or Firm* — BROWDY AND NEIMARK, P.L.L.C.

(57) ABSTRACT

The present application provides an image sensor, a global shutter control method and a computer storage medium. The image sensor includes a pixel array, where the pixel array includes a plurality of columns of pixels, or the pixel array includes a plurality of groups of sub-pixel arrays, each group of sub-pixel arrays including a plurality of columns/rows of pixels; and a processor module which triggers the pixel array on the basis of an instruction. According to the control method, consistency of an average delay of the columns/rows or groups in the pixel array is achieved by dynamic averaging. In addition, the consistency cannot be affected by external conditions such as a process, a power supply or the temperature. A high instantaneous current caused by using a global shutter manner is avoided, and at the same time, there is no need for a digital processor to perform column-by-column or row-by-row correction at a back end after exposure is not required, so as to reduce hardware cost and test cost.

14 Claims, 4 Drawing Sheets

(58) Field of Classification Search
CPC .... H04N 25/778; H04N 25/767; H04N 25/75;
H01L 27/1464; H01L 27/14645; H01L
27/124; H01L 27/14696; H01L 27/14632;
H01L 27/1207; H01L 27/1255; H01L
27/1225; H01L 27/14623; H01L
27/14634; H01L 27/14627; H01L
27/14621; H01L 31/0322; H01L 31/0272;
H01L 29/7869; H01L 29/24; H02S 40/44;
Y02E 10/60; Y02E 10/541; Y02P 70/50
USPC .................................................. 348/207.99
See application file for complete search history.

(56) References Cited

U.S. PATENT DOCUMENTS

| | | | | |
|---|---|---|---|---|
| 2010/0245647 | A1* | 9/2010 | Honda | H04N 25/76 348/308 |
| 2016/0013227 | A1* | 1/2016 | Kim | H01L 27/14612 257/229 |
| 2016/0337607 | A1 | 11/2016 | Okamoto et al. | |
| 2016/0344957 | A1* | 11/2016 | Kaehler | H04N 25/531 |
| 2017/0195574 | A1* | 7/2017 | Wong | H04N 23/843 |
| 2017/0195588 | A1* | 7/2017 | Nalla | H01L 27/14623 |
| 2017/0289481 | A1* | 10/2017 | Kanehara | H04N 25/766 |
| 2018/0332246 | A1* | 11/2018 | Sanchez | H04N 25/771 |
| 2019/0181171 | A1* | 6/2019 | Tadmor | H04N 25/40 |
| 2020/0068148 | A1* | 2/2020 | Malinge | H04N 25/59 |
| 2020/0159809 | A1* | 5/2020 | Catthoor | G06N 3/045 |
| 2021/0152756 | A1* | 5/2021 | Wang | H04N 25/50 |

FOREIGN PATENT DOCUMENTS

| | | |
|---|---|---|
| CN | 108141575 A | 6/2018 |
| CN | 108781264 A | 11/2018 |
| CN | 111601053 A | 8/2020 |

* cited by examiner

IMAGE SENSOR, GLOBAL SHUTTER CONTROL METHOD AND COMPUTER STORAGE MEDIUM

FIELD OF TECHNOLOGY

The present application relates to the technical field of image sensors, in particular to an image sensor and a global shutter control method thereof and a computer storage medium.

BACKGROUND

The image sensor technology is widely used with its development. Present image sensor has two shutter modes: a rolling shutter and a global shutter. The rolling shutter refers to gradual exposure of pixels; and the global shutter means that the whole scene is exposed simultaneously. As shown in FIG. 1, in the global shutter mode, the global shutter shares the same shutter control signal, and all pixels of an image sensor simultaneously collect light rays and are simultaneously exposed. Compared with the rolling shutter, the global shutter can significantly improve ghosting blur caused by high-speed movement of the captured subjects. Featuring naturally advantages of subject capturing speed and information processing speed, the global shutter has become the mainstream in application fields of image sensors, infrared Time of Flight (TOF) depth detection, etc. But it has obvious disadvantages that so many pixels are switched-on simultaneously, a high instantaneous peak current can be introduced which causes serious electromagnetic interference to other peripheral chips or devices, and extremely high design requirements for global shutter control signal drive and application circuit boards of a power supply and of a chip are put forward.

In order to reduce the high instantaneous current caused by the global shutter manner, usually delay of the shutter control signal reaching each pixel cannot be made completely identical in applications. As shown in FIG. 2, delays are configured between columns of pixels or between pixel rows, and the exposure starting time is deliberately staggered by the delay to lower the high instantaneous current. In this way, deliberately staggering the exposure starting time of columns of the pixel array can reduce the peak current, but it also leads to mismatch of the starting time of each pixel column. The accuracy requirement for this kind of mismatch time is very high in many applications. For example, in an application of TOF, a deviation of the starting time of each column of pixels is directly equivalent to an error of depth measurement of the TOF. Each column will introduce a different measurement error if the starting time thereof is different. And the errors will change according to the process deviation, power supply voltage deviation and temperature change. Therefore, in an existing TOF implementation solution, a digital processor is required for column-by-column correction after exposure, which increases hardware cost and greatly increases test cost accordingly.

SUMMARY

To overcome the above defects, one of the objectives of the present application is to provide a novel image sensor and a global shutter delay control method thereof. The control method may not only avoid a high instantaneous current of the image sensor caused by using a global shutter manner, but avoid causing a delay error between different columns of pixels, and there is no need for a digital processor to perform column-by-column or row-by-row correction at a back end.

In order to achieve the above objective, the present application uses the following technical solution: an image sensor, including a pixel array, wherein the pixel array includes a plurality of columns of pixels, local control signals of adjacent columns of pixels being electrically connected through a delay unit, or the pixel array includes a plurality of groups of sub-pixel arrays, each group of sub-pixel arrays including a plurality of columns/rows of pixels, local control signals of adjacent columns/rows of pixels being electrically connected through a delay unit; and a processor module which triggers the pixel array on the basis of an instruction.

In an embodiment, the delay unit includes a RC-type delay unit, a bidirectional drive circuit delay unit, a phase-locked loop or a delay phase-locked loop.

The technical solution of the present application further provides the global shutter control method of the image sensor. The control method includes: the processor module receives a corresponding control signal, for example, a control signal GTX, and triggers different columns or rows of the pixel array on the basis of a preset rule, and then reversely triggers different columns or rows of the pixel array, so as to complete global control once. For example, on the basis of the preset rule, the processor module sequentially triggers clockwise different columns or rows of the pixel array and then sequentially triggers counterclockwise different columns or rows of the pixel array, so as to complete the global control once.

According to the control method, consistency of an average delay of the columns/rows or groups in the pixel array is achieved by dynamic averaging. In addition, the consistency cannot be affected by external conditions such as a process, a power supply or the temperature. The control method avoids the high instantaneous current caused by use of the global shutter manner, and there is no need for a digital processor to perform column-by-column or row-by-row correction at the back end after exposure, so as to reduce hardware cost and test cost, and the consistent average delay is achieved between pixels in different rows in the array of the image sensor.

In an embodiment, the control method includes: the processor module performs in-turn selection on the basis of a start mode of pseudo-random codes to trigger the pixel array, so as to complete the global control once.

In an embodiment, the pixel array includes a pixel array of N columns, and a nearest path between a third column of pixels and a first column of pixels is disconnected, and the control method includes:

S1, for a first start, inputting a control signal GTX from a position closest to the third column of pixels, so as to start the third column of pixels at the earliest, and starting other columns of pixels in a sequence of the third column→a fifth column→ . . . →a $N^{th}$ column→ . . . →a fourth column→a second column→the first column;

S2, for a second start, inputting the control signal GTX from a position closest to the fifth column of pixels, disconnecting a nearest path between the third column and the fifth column, and starting other columns of pixels in a sequence of the fifth column→ . . . →the $N^{th}$ column→ . . . → the fourth column→the second column→the first column→the third column;

in this way until.

SN, when the control signal GTX is started for N$^{th}$ time, starting the columns of pixels in a sequence of the Nth column→ . . . →the fourth column→the second column→the first column→the third column→the fifth column→ . . . →the N−1th; proceeding with, SN+1, when the control signal GTX is started for N+1$^{th}$ time, starting the columns of pixels in a sequence of the second column→the fourth column→ . . . →the N$^{th}$ column→the fifth column→the third column→the first column;

SN+2, when the control signal GTX is started for N+2$^{th}$ time, starting the columns of pixels in a sequence of the fourth column→ . . . →the N$^{th}$ column→the fifth column→the third column→the first column→the second column;

until,

S2N, when the control signal GTX is started for 2N$^{th}$ time, starting the columns of pixels in a sequence of the first column→the second column→the fourth column→ . . . →the N$^{h}$ column→ . . . →the fifth column→the third column, so as to complete the global control once.

The GTX is the original global shutter control signal. Thus, the global control is completed once. According to the control method, each column of pixels in the image sensor experiences various delay from the shortest to the longest successively. After 2N cycles, the average delay of each column of pixel is equal, and the delay error between different columns of pixels is not limited by the delay provided by the delay unit, but only affected by intrinsic mismatch of devices. In this way, the global shutter delay control method may avoid causing the delay error between different columns of pixels while the high instantaneous current mentioned in the background art is avoided, and there is no need for a digital processor to perform correction at the back end after the delay.

In an embodiment, source of local control signal of each column of pixels includes: the control signal GTX, a control signal provided by clockwise adjacent column of pixels and a control signal provided by counterclockwise adjacent column of pixels.

In an embodiment, in S1, local control signal of the third column of pixels is provided by the GTX, and local control signals of other columns of pixels are all provided by counterclockwise adjacent columns of pixels or all provided by the clockwise adjacent columns of pixels.

In an embodiment, according to the global shutter control method of the image sensor, an actual exposure control signal GTXi of any column of pixels in the pixel array is selected as a signal source, a light drive signal LD_out is generated through a fixed delay unit, and the control signal is a command signal for selecting control; or an initial signal LD driven by light is used for producing an actual light drive signal LD_out through the same control method as that of a control signal GTX.

The present application further provides a computer storage medium, including a computer program, where the computer program runs the control method above.

Beneficial Effects the global shutter control method of the image sensor proposed by the present application avoids the high instantaneous current caused by using the global shutter manner, and column-by-column or row-by-row correction at the back end after exposure performed by the digital processor is not required, so as to reduce the hardware cost and the test cost.

BRIEF DESCRIPTION OF THE DRAWINGS

The advantages of the above and/or additional aspects of the present application will become apparent and easy to understand from the following description of embodiments in conjunction with the accompanying drawings. In the figures.

DESCRIPTION OF THE EMBODIMENTS

To understand the above objectives, features and advantages of the present application more clearly, the following will further describe the present disclosure in detail with reference to the accompanying drawings and in conjunction with particular embodiments. It should be noted that embodiments in the present application and features in the embodiments may be combined with one another if there is no conflict.

The present application provides a global shutter delay control method, which achieves consistency of an average delay of columns/rows or groups in a pixel array by dynamic averaging, and the consistency cannot be affected by external conditions such as a process, a power supply or the temperature. The control method avoids high instantaneous current caused by use of a global shutter manner, and there is no need for a digital processor to perform column-by-column or row-by-row correction at a back end after exposure, so as to reduce hardware cost and test cost. By using the control method, a consistent average delay among pixels in different rows in the array of the image sensor may be achieved.

Next, the global shutter delay control method proposed in the present application is described with reference to FIG. 3a to FIG. 7.

Figure 1:
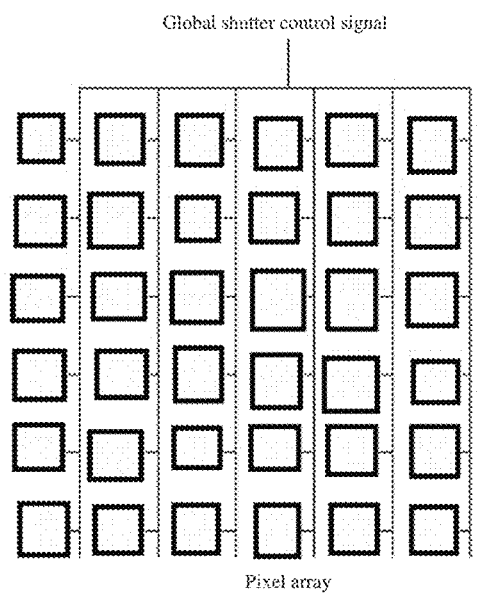
FIG. 1 is a schematic diagram of a control method of an existing image sensor using a global shutter.
Figure 2:
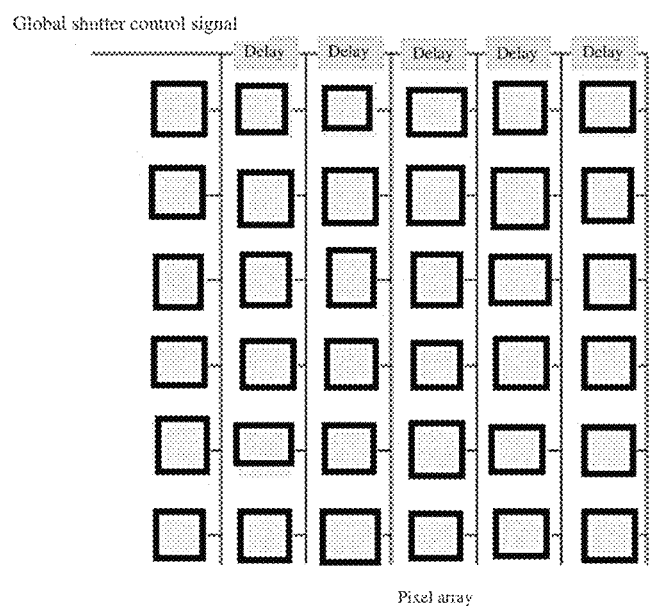
FIG. 2 is a schematic diagram of a global delay control method of the existing image sensor using a global shutter.
Figure 3A:
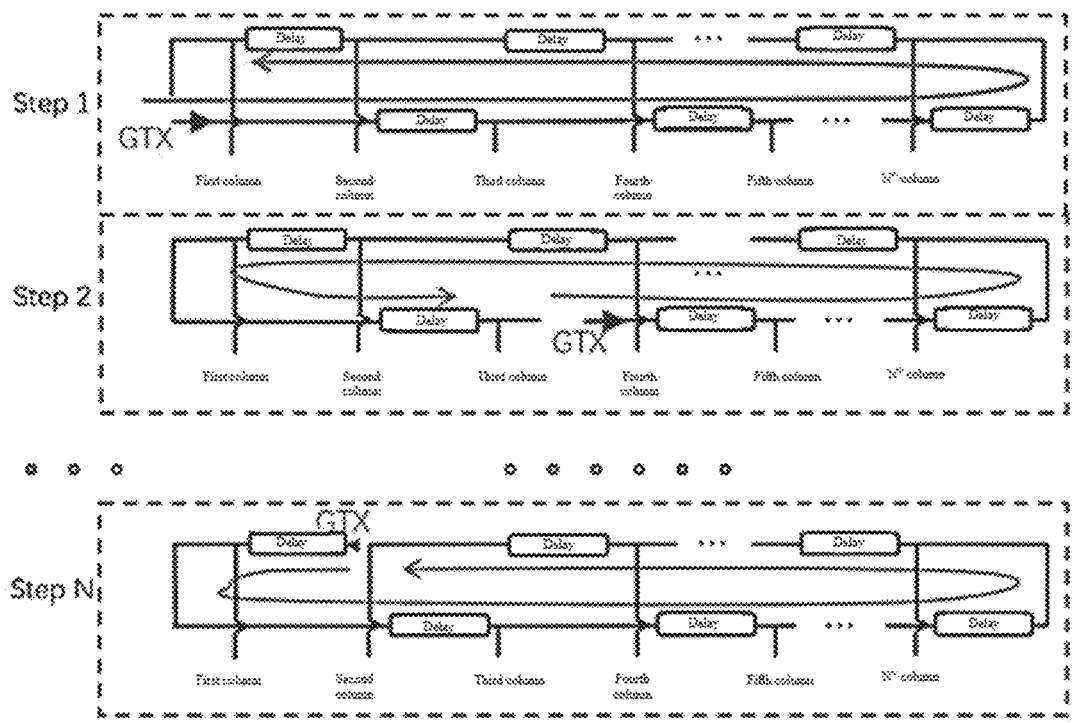
FIGS. 3a and 3b are schematic diagrams of a global delay control method of an image sensor according to an embodiment of the present application.
Figure 3B:
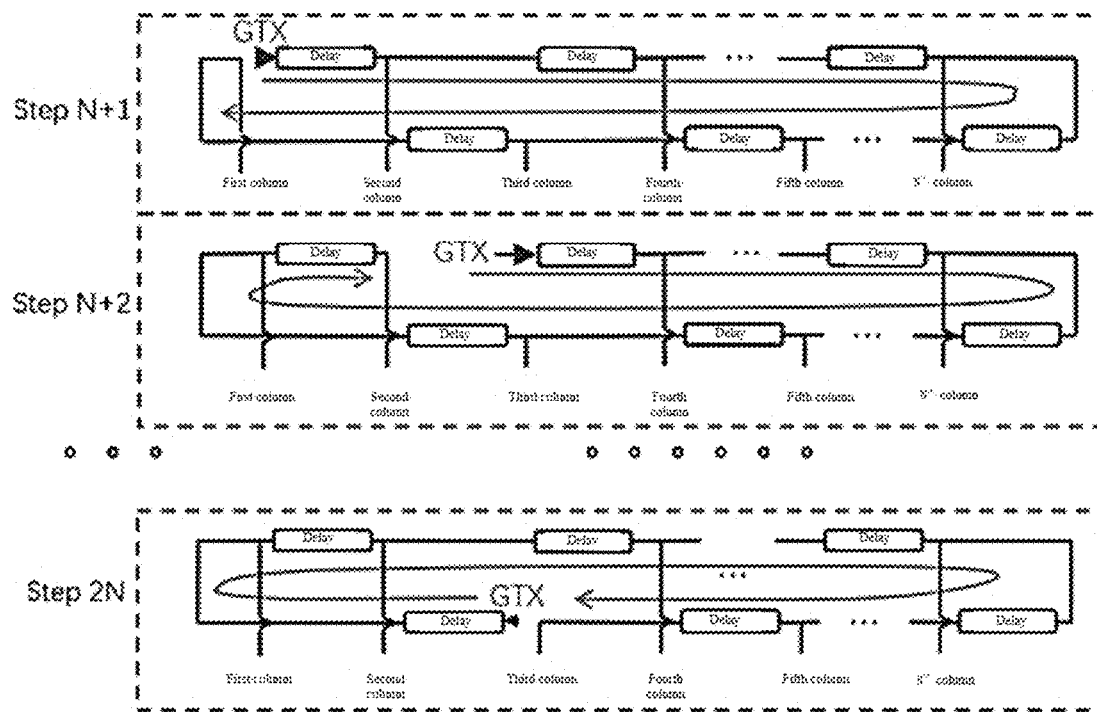

FIGS. 3a and 3b are schematic diagrams of the global shutter delay control method of the image sensor according to an embodiment of the present application. A control mechanism of the control method is described as follows: a GTX is an original global shutter control signal, it is assumed that the image sensor includes a pixel array of N columns, a nearest path between a third column of pixels and a first column of pixels is disconnected ('disconnected' means physically disconnected to avoid all pixels being connected through a ring, the ring is disconnected by physical disconnection, so a path from the third column of pixels to the first column of pixels is unique, instead of clockwise and counterclockwise paths being permitted at the same time), and local control signals of adjacent columns of pixels are electrically connected through delay units. FIG. 3a shows a triggering sequence of step S1 to step SN, and FIG. 3b shows a triggering sequence of step SN+1 to step S2N.

Step S1, for a first start, a control signal GTX is input from a position closest to the third column of pixels, so as to start the third column of pixels at the earliest, and other columns of pixels are started in a sequence of the third column→a fifth column→ . . . →a $N^{th}$ column→ . . . →a fourth column→a second column→a first column. Since a control signal of the first column of pixels and a control signal of the third column is disconnected, the first column is started at the latest.

Step S2, for a second start, the control signal GTX is input from a position closest to the fifth column of pixels. A nearest path between the third column and the fifth column is disconnected. Thus, other columns of pixels are started in a sequence of the fifth column→ . . . →the $N^{th}$ column→ . . . →the fourth column→the second column→the first column→the third column.

By analogy, after the GTX is input clockwise (that is, the column number increases) from positions close to the columns of pixels until step SN, when the control signal GTX is started for the $N^{th}$ time, the columns of pixels are started in a sequence of the $N^{th}$ column→ . . . →the fourth column→the second column→the first column→the third column→the fifth column→ . . . →the N−$1^{th}$ column, then (contrary to the triggering sequence of S1 . . . SN), the GTX control signal is input at the positions close to the columns of pixels, and a reverse cycle (as shown in FIG. 3b) proceeds:

step SN+1: the GTX is started for the N+$1^{th}$ time, the columns of pixels are started in a sequence of the second column→the fourth column→ . . . →the $N^{th}$ column→the fifth column→the third column→the first column, step SN+2: the GTX is started for the N+2' time, the columns of pixels are started in a sequence of the fourth column→ . . . →the $N^{th}$ column→the fifth column→the third column→the first column→the second column.

Until step S2N: the GTX is started for the $2N^{th}$ time, the columns of pixels are started in a sequence of the first column→the second column→the fourth column→ . . . →the $N^{th}$ column→ . . . →the fifth column→the third column. Thus, the global control is completed once. According to the control method, the columns of pixels in the image sensor experience various delays from the shortest to the longest successively. After 2N cycles, the average delays of the columns of pixels are equal, and the delay error between different columns of pixels is not limited by the delay provided by the delay unit, but only affected by intrinsic mismatch of devices. However, in a practical application, an error caused by intrinsic mismatch is almost negligible compared with that caused by an original delay. In this way, the global shutter delay control method may avoid the high instantaneous current mentioned in the background and may not cause the delay error between different columns of pixels, and a digital processor for correction at the back end is not required after the delay. In this embodiment, the control signal GTX is input from the position nearest to the third column pixels firstly, there are 3 sources of local control signals of each column of pixels: the control signal GTX, a control signal provided by clockwise adjacent column of pixels and a control signal provided by counterclockwise adjacent column of pixels. In an embodiment, in Step1, local control signals of the third column of pixels are provided by the GTX, and local control signals of other columns of pixels are all provided by counterclockwise adjacent columns of pixels. In other embodiments, in Step1, the GTX may be provided to any column of pixels. At the same time, local control signals of other columns of pixels are all provided by counterclockwise adjacent columns of pixels, or may be all provided by clockwise adjacent columns of pixels. The present application is not limited thereto, as long as the start sequence of different columns/rows or different groups of the pixel array is selected in turn, so as to achieve the same start time point through averaging for many times despite different start time point each time.

Figure 4:
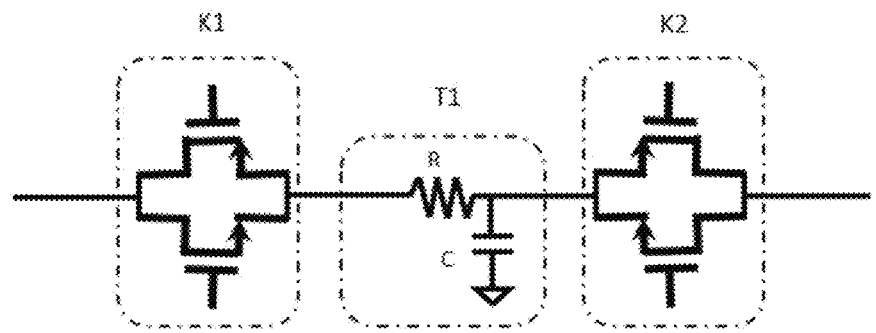
FIG. 4 is a schematic diagram of a delay unit according to an embodiment of the present application.

In an embodiment, as shown in FIG. 4, the delay unit T1 includes a resistance R and a capacitance C. In a preferred way, the resistance R is an equivalent resistance (R) of metal connection, and the capacitance C is a parasitic load capacitor, so as to realize an RC delay.

Figure 5:
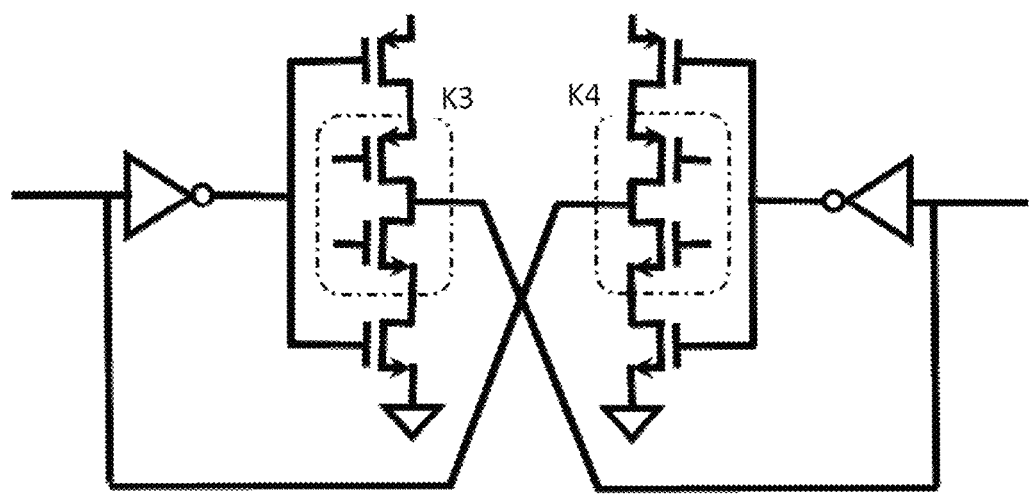
FIG. 5 is a schematic diagram of switch control according to an embodiment of the present application.

In an embodiment, the delay unit uses a bidirectional drive circuit to realize the delay (as shown in FIG. 5). Alternatively, other embodiments may implement the delay in any suitable way.

Figure 6A:
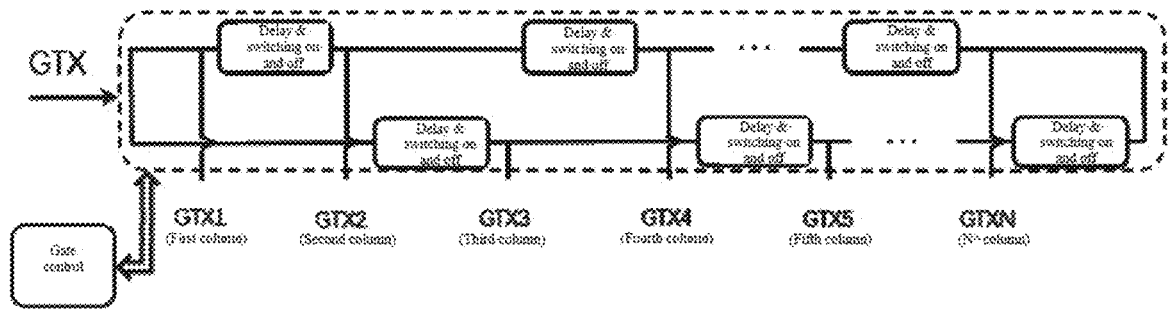
FIGS. 6a, 6b and 7 are schematic diagrams of controlling an optical drive signal according to an embodiment of the present application.
Figure 6B:
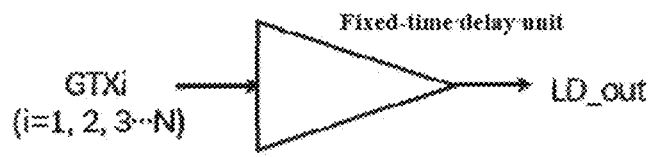

A GTX control line may be connected to or disconnected from the delay unit through, but not limiting to, the methods shown in FIG. 6a and FIG. 6b. For example, a transmission gate may be used to realize a function of a switch, or bidirectional drive stages may be set to a state of high output resistance at the same time by using a switching on and off control signal of a bidirectional drive stage circuit, so as to realize a function of switching off.

Figure 7:
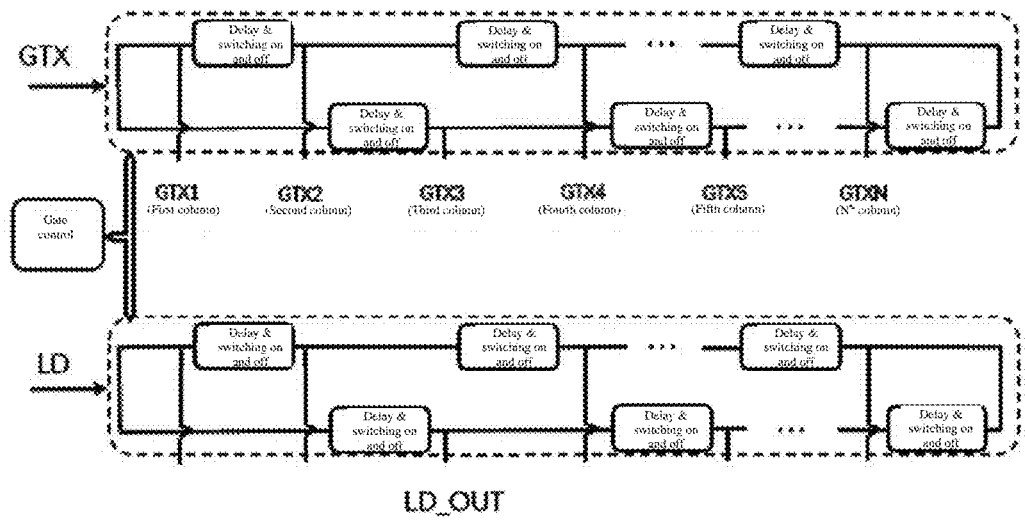

An actual exposure control signal GTXi of any column of pixels may be selected as the control signal, and a light drive signal LD_out is generated through a fixed delay unit (shown in FIGS. 6a and 6b). The fixed delay unit may be implemented through a clock control circuit such as a phase-locked loop (PLL) and a delay phase-locked loop (DLL). Alternatively, as shown in FIG. 7, for an original light drive signal LD, the same delay control manner as that of GTX is used, and an output of any one of nodes may be taken as the actual light drive signal LD_out. Since the circuit and layout are exactly the same, an average delay from the original LD signal to the actual output LD_out is the same as the average delay from the original GTX to each column of exposure control signal, the two average delays may be offset, thus ensuring that a time difference from light emitting to light returning may not be affected by the above delay. In other embodiments, the control signal is not limited to the embodiments of FIG. 6a, FIG. 6b and FIG. 7, as long as a stable time difference between the light drive signal and the actual exposure control signal GTXi of the columns/rows of pixels may be realized and the time difference may be desensitized to external environment (a voltage, a temperature, etc.) and process deviation.

The above control method is used for the light-emitting control of a TOF apparatus, guaranteeing consistency of a relative delay between the shutter control signal and the light-emitting control signal, such that the TOF apparatus may still achieve high measurement accuracy without back-end correction through the digital processor, and greatly save the original test and correction cost and improve economy of the TOF apparatus.

In an embodiment, the pixel array of the image sensor may also be grouped according to different requirements of high instantaneous current actually tolerated by a system, the pixel array may be divided into a plurality of columns or a plurality of groups with a plurality of columns of pixels as a group, such that the above control method may be used to realize complete synchronous exposure in the group, and time points when exposure is started are staggered among different groups through delays, such that upper limit requirements of the high instantaneous current of the system may be taken into account and a scale of a cycling circuit may be reduced.

In an embodiment, the image sensor further includes a processor module, which performs in-turn selection on the basis of a start manner of pseudo-random codes, so as to achieve the same start time point through averaging for many times despite different start time point each time.

In an embodiment, the processor module receives a corresponding control signal, sequentially triggers (for example clockwise) different columns or rows of the pixel array on the basis of a preset rule, and then sequentially and reversely triggers (for example counterclockwise) different columns or rows of the pixel array, so as to complete a global control once, and achieve the same start time through averaging for two times (or more times) despite different start time each time.

The control method proposed in the present application is suitable for an application scene where the global shutter is needed, and influence of the high instantaneous current and the exposure time error of points of the pixel array are taken into account. The control method may be applied to TOF occasions. Since the TOF calculates distance information by detecting round-trip time of light pulses, the global shutter signal is used to capture time of light returning from an object, and the light drive signal (LD) is used to control time of light emitting. The error of the time difference between the two signals may directly affect measurement accuracy of the TOF. The control method proposed in the present application is not limited to the TOF application.

An embodiment of the present application provides a computer storage medium. The computer storage medium includes a computer program and the computer program runs to implement the global shutter control method above.

Those skilled in the art may understand that whole or partial steps in the above embodiments of the method may be completed by instructing relevant hardware by the program. The foregoing program may be stored in a computer (processor) readable storage medium. When the program is executed, the steps of the above embodiments of the method are executed, the foregoing storage medium includes a read only memory (ROM), a random access memory (RAM), a diskette or optical disk, etc. and other media that may store program codes.

In the control method implemented above, while the high instantaneous current is lowered when the control method is implemented, consistency of an average delay of the columns/rows or groups in the pixel array is achieved by dynamic averaging. In addition, the consistency may not be affected by external conditions such as a process, a power supply or the temperature.

In the control method implemented above, the average delay from the GTX signal to each column of pixels is equal, but specific delays are affected by factors such as a process deviation, a voltage deviation and temperature change. The change of the delays will be directly converted into the error of the time difference between the light emitting and the light returning, that is, the measurement error of the TOF. The error may be corrected and compensated by the subsequent digital processor. Compared with existing embodiments, each column/row does not need to be corrected separately, which reduces the test cost and the hardware cost.

The embodiment above is merely used for describing the technical conception and features of the present invention, aims at enabling a person who is familiar with such technology to know the contents of the present invention and perform implementation according to the same, and may not be used as limiting a protection range of the present invention. Any equivalent change or modification made according to the spirit essence of the present invention shall fall within the protection range of the present invention.

What is claimed is:

1. An image sensor, comprising:
   a pixel array, the pixel array comprising a plurality of columns of pixels, local control signals of adjacent columns of pixels being electrically connected through delay units respectively; or, the pixel array comprising a plurality of groups of sub-pixel arrays, each group of sub-pixel arrays comprising a plurality of columns/rows of pixels, and local control signals of adjacent columns/rows of pixels being electrically connected through delay units respectively;
   a processor module, which is electrically connected to the pixel array and triggers the corresponding pixel array on a basis of an instruction;
   wherein the processor module receives a control signal, triggers different columns or rows of the pixel array on a basis of a preset order, and then triggers the different columns or rows of the pixel array in an order reverse to the preset order, so as to complete global control once.

2. The image sensor according to claim 1, wherein the delay unit comprises at least one of a RC-type delay unit, a bidirectional drive circuit delay unit, a phase-locked loop or a delay phase-locked loop.

3. A global shutter control method of an image sensor according to claim 1, wherein the processor module triggers the pixel array on a basis of a starting mode of pseudo-random codes, so as to complete the global control once.

4. The global shutter control method according to claim 3, wherein:
   a GTX is provided to any column/row of pixels in the pixel array when the pixel array is triggered for the first time, and local control signals of other columns of pixels in the pixel array are all provided by adjacent columns of pixels according to the preset order; wherein the GTX is a global shutter control signal.

5. The global shutter control method according to claim 3, wherein the pixel array comprises an array of N columns of pixels, and a nearest path between a third column of pixels and a first column of pixels is disconnected, the control method comprising:
   Step 1, for a first start, inputting a GTX from a position closest to the third column of pixels, so as to start the third column of pixels at the earliest, and starting other columns of pixels in a sequence of the third column, a fifth column, . . . , an $N^{th}$ column, . . . , a fourth column, a second column, and the first column;
   Step 2, for a second start, inputting the GTX from a position closest to the fifth column of pixels, disconnecting a nearest path between the third column and the fifth column, and starting other columns of pixels in a sequence of the fifth column, . . . , the $N^{th}$ column, . . . , the fourth column, the second column, the first column, and the third column;
   in this way until,
   Step N, when the GTX is started for an $N^{th}$ time, starting the columns of pixels in a sequence of the $N^{th}$ column, . . . , the fourth column, the second column, the first column, the third column, the fifth column, . . . , and the $N-1^{th}$ column; proceeding with,
   Step N+1, when the GTX is started for an $N+1^{th}$ time, starting the columns of pixels in a sequence of the second column, the fourth column, . . . , the $N^{th}$ column, the fifth column, the third column, and the first column;

Step N+2, when the GTX is started for an $N+2^{th}$ time, starting the columns of pixels in a sequence of the fourth column, . . . , the $N^{th}$ column, the fifth column, the third column, the first column, and the second column;

in this way until,

Step 2N, when the GTX is started for a $2N^{th}$ time, starting the columns of pixels in a sequence of the first column, the second column, the fourth column, . . . , the $N^{th}$ column, . . . , the fifth column, and the third column, so as to complete the global control once;

wherein the GTX is a global shutter control signal.

6. The global shutter control method according to claim 5, wherein a source of local control signal of each column of pixels comprises: the GTX, and a control signal provided by adjacent columns of pixels according to the preset order.

7. The global shutter control method according to claim 5, wherein in Step 1, local control signal of the third column of pixels is provided by the GTX, and local control signals of other columns of pixels are all provided by adjacent columns of pixels according to the preset order.

8. A global shutter control method of an image sensor according to claim 1, wherein a global shutter control signal GTX is provided to any column of pixels in the pixel array and is selected as a signal source, which generates a light drive signal LD_out through a fixed delay unit; or an initial signal LD driven by light is used for producing the light drive signal LD_out by a fixed delay unit.

9. The global shutter control method according to claim 8, wherein the processor module triggers the pixel array on a basis of a starting mode of pseudo-random codes, so as to complete the global control once.

10. The global shutter control method according to claim 8, wherein the initial signal LD is provided to any column/row of pixels in the pixel array when the pixel array is triggered for the first time, and local control signals of the remaining columns of pixels in the pixel array are all provided by adjacent columns of pixels according to the preset order.

11. The global shutter control method according to claim 8, wherein the pixel array comprises a pixel array of N columns of pixels, and a nearest path between a third column of pixels and a first column of pixels is disconnected, the control method comprising:

Step 1, for a first start, inputting a control signal GTX from a position closest to the third column of pixels, so as to start the third column of pixels at the earliest, and starting other columns of pixels in a sequence of the third column, a fifth column, . . . , an $N^{th}$ column, . . . , a fourth column, a second column, and the first column;

Step 2, for a second start, inputting the control signal GTX from a position closest to the fifth column of pixels, disconnecting a nearest path between the third column and the fifth column, and starting other columns of pixels in a sequence of the fifth column, . . . , the $N^{th}$ column, . . . , the fourth column, the second column, the first column, and the third column;

in this way until,

Step N, when the control signal GTX is started for an $N^{th}$ time, starting the columns of pixels in a sequence of the $N^{th}$ column, . . . , the fourth column, the second column, the first column, the third column, the fifth column, . . . , and the $N-1^{th}$ column; proceeding with, Step N+1, when the control signal GTX is started for an $N+1^{th}$ time, starting the columns of pixels in a sequence of the second column, the fourth column, . . . , the $N^{th}$ column, the fifth column, the third column, and the first column;

Step N+2, when the control signal GTX is started for an $N+2^{th}$ time, starting the columns of pixels in a sequence of the fourth column, . . . , the $N^{th}$ column, the fifth column, the third column, the first column, and the second column;

in this way until,

Step 2N, when the control signal GTX is started for a $2N^{th}$ time, starting the columns of pixels in a sequence of the first column, the second column, the fourth column, . . . , the $N^{th}$ column, . . . , the fifth column, and the third column, so as to complete the global control once;

wherein the GTX is a global shutter control signal.

12. The global shutter control method according to claim 11, wherein a source of local control signal of each column of pixels comprises: the GTX, a control signal provided by adjacent columns of pixels according to the preset order.

13. The global shutter control method according to claim 11, wherein in Step 1, the local control signal of the third column of pixels is provided by the GTX, and local control signals of other columns of pixels are all provided by adjacent columns of pixels according to the preset order.

14. A non-transitory computer storage medium comprising a computer program that runs a global shutter control method of an image sensor according to claim 1.

* * * * *